(12) United States Patent
Tsai et al.

(10) Patent No.: US 9,448,372 B2
(45) Date of Patent: Sep. 20, 2016

(54) OPTICAL COUPLING ELEMENT AND OPTICAL MODULE HAVING THE SAME

(71) Applicant: Applied Optoelectronics, Inc., New Taipei (TW)

(72) Inventors: Chao-Hung Tsai, New Taipei (TW); Jian-Hong Luo, New Taipei (TW); Li-Chieh Su, New Taipei (TW); Chang-Sheng Lin, New Taipei (TW)

(73) Assignee: Applied Optoelectronics, Inc., Sugar Land, TX (US)

( * ) Notice: Subject to any disclaimer, the term of this patent is extended or adjusted under 35 U.S.C. 154(b) by 44 days.

(21) Appl. No.: 14/482,550

(22) Filed: Sep. 10, 2014

(65) Prior Publication Data

US 2015/0309270 A1 Oct. 29, 2015

(30) Foreign Application Priority Data

Apr. 25, 2014 (CN) .......................... 2014 1 0172147

(51) Int. Cl.
*G02B 6/34* (2006.01)
*G02B 6/42* (2006.01)
(52) U.S. Cl.
CPC ........... *G02B 6/4214* (2013.01); *G02B 6/4292* (2013.01); *G02B 6/4206* (2013.01)
(58) Field of Classification Search
None
See application file for complete search history.

(56) References Cited

U.S. PATENT DOCUMENTS

| 9,235,012 B1* | 1/2016 | Hung | G02B 6/34 |
| 2012/0314996 A1* | 12/2012 | Yu | G02B 6/4214 385/33 |
| 2014/0153605 A1* | 6/2014 | Arimoto | H01S 5/0267 372/50.11 |
| 2015/0247984 A1* | 9/2015 | Konishi | G02B 6/4214 385/88 |
| 2015/0293317 A1* | 10/2015 | Kim | G02B 6/423 385/89 |

* cited by examiner

*Primary Examiner* — Hemang Sanghavi
(74) *Attorney, Agent, or Firm* — Grossman Tucker Perreault & Pfleger, PLLC; Norman S. Kinsella

(57) ABSTRACT

An optical coupling element, for coupling a light emitting element to a light transmission element, includes a light guide element. The light guide element has a light incident part, a total reflection surface and a light output part. The light incident path is formed at the light incident part corresponding to the light emitting element. The light reflection path is formed at the light output part corresponding to the light transmission element. The first included angle θ1 is formed between the light incident path and the total reflection surface and is not equal to 45 degrees. The light emitting element is adapted to emit a beam toward the total reflection surface along the light incident path by passing through the light guide element from the light incident part. Moreover, the beam is reflected by the total reflection surface and is outputted toward the light transmission element.

18 Claims, 4 Drawing Sheets

OPTICAL COUPLING ELEMENT AND OPTICAL MODULE HAVING THE SAME

CROSS-REFERENCE TO RELATED APPLICATIONS

This non-provisional application claims priority under 35 U.S.C. §119(a) on Patent Application No(s). 201410172147.9 filed in China on Apr. 25, 2014, the entire contents of which are hereby incorporated by reference.

BACKGROUND

1. Technical Field

The disclosure relates to a lens structure. More particularly, the disclosure relates to an optical coupling element and an optical module having the same.

2. Background

There are two ways for the photoelectrical transmission. One is to couple beams emitted from a laser transmitter to an optical fiber by turning their optical paths 90 degrees by a 45-degree total reflection surface. The other way is to transmit the beams horizontally without turning the optical paths, in order to couple lens arrays to the optical fiber.

With the 45-degree total reflection surface, reflections and focal lengths may be controlled easily in the photoelectrical transmission. Additionally, the transmission efficiency of the photoelectrical transmission may also be improved. Thus, a user usually couples the beams emitted from the laser transmitter to the optical fiber by the 45-degree total reflection surface.

However, because the materials of the optical fiber do not suit to the photoelectrical transmission and the beams are perpendicular to optical coupling surface of the optical fiber, parts of the beams emitted from the laser transmitter may be reflected back to the laser transmitter by the optical coupling surface. Moreover, optical interferences may occur as well, which reduces the transmission efficiency of the photoelectrical transmission. To improve the optical interferences, an 8-degree inclined plane is developed. Although the 8-degree inclined plane may be adapted to prevent the beams from being reflected back to the laser transmitter by the optical coupling surface, the optical coupling effects of the optical fiber may be significantly decreased. Thus, it is important to improve the optical coupling effects and the optical interferences in the photoelectrical transmission in this field.

SUMMARY

In one aspect of the disclosure provides an optical coupling element, for coupling a light emitting element to a light transmission element. The optical coupling element comprises a light guide element which has a light incident part, a total reflection surface and a light output part. The light incident path is formed at the light incident part corresponding to the light emitting element. The light reflection path is formed at the light output part corresponding to the light transmission element. The first included angle θ1 is formed between the light incident path and the total reflection surface, and the first included angle θ1 is not equal to 45 degrees. The light emitting element is adapted to emit a beam toward the total reflection surface along the light incident path by passing through the light guide element from the light incident part. Moreover, the beam is reflected by the total reflection surface, and the beam is outputted toward the light transmission element from the light output part.

In another aspect of the disclosure provides an optical module which comprises a light emitting element, a light transmission element and an optical coupling element. The light emitting element is adapted to emit a beam. The light emitting element is coupled to the light transmission element. The optical coupling element comprises a light guide element. The light guide element has a light incident part, a total reflection surface and a light output part. The light incident path is formed at the light incident part corresponding to the light emitting element. The light reflection path is formed at the light output part corresponding to the light transmission element. The first included angle θ1 is formed between the light incident path and the total reflection surface, and the first included angle θ1 is not equal to 45 degrees. The light emitting element is adapted to emit a beam toward the total reflection surface along the light incident path by passing through the light guide element from the light incident part. Moreover, the beam is reflected by the total reflection surface, and the beam is outputted toward the light transmission element from the light output part.

BRIEF DESCRIPTION OF THE DRAWINGS

The disclosure will become more fully understood from the detailed description given hereinbelow and the accompanying drawings which are given by way of illustration only and thus are not limitative of the disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
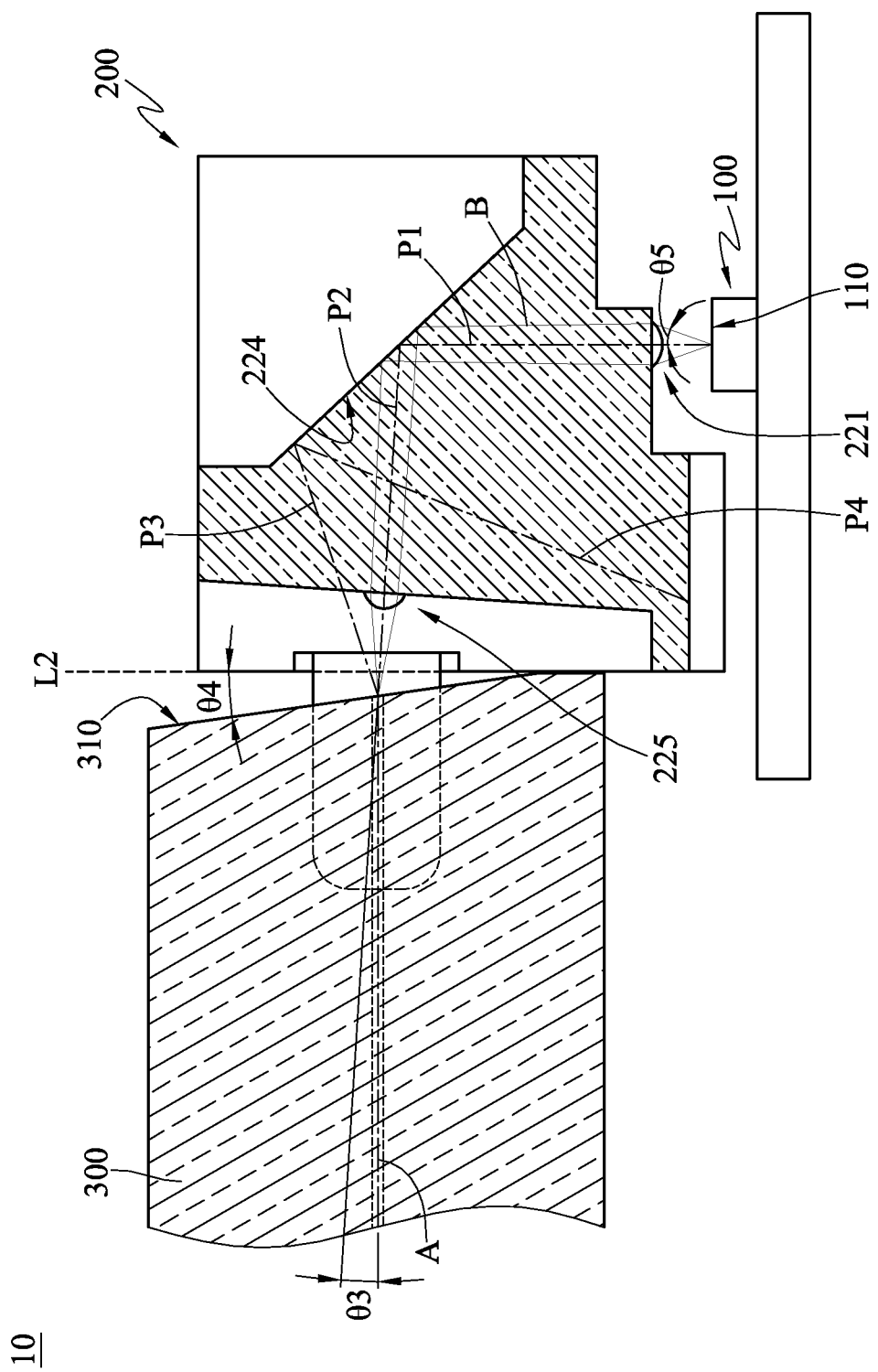
FIG. 1 is a schematic plan view of an optical module according to a first embodiment of the disclosure.
Figure 2:
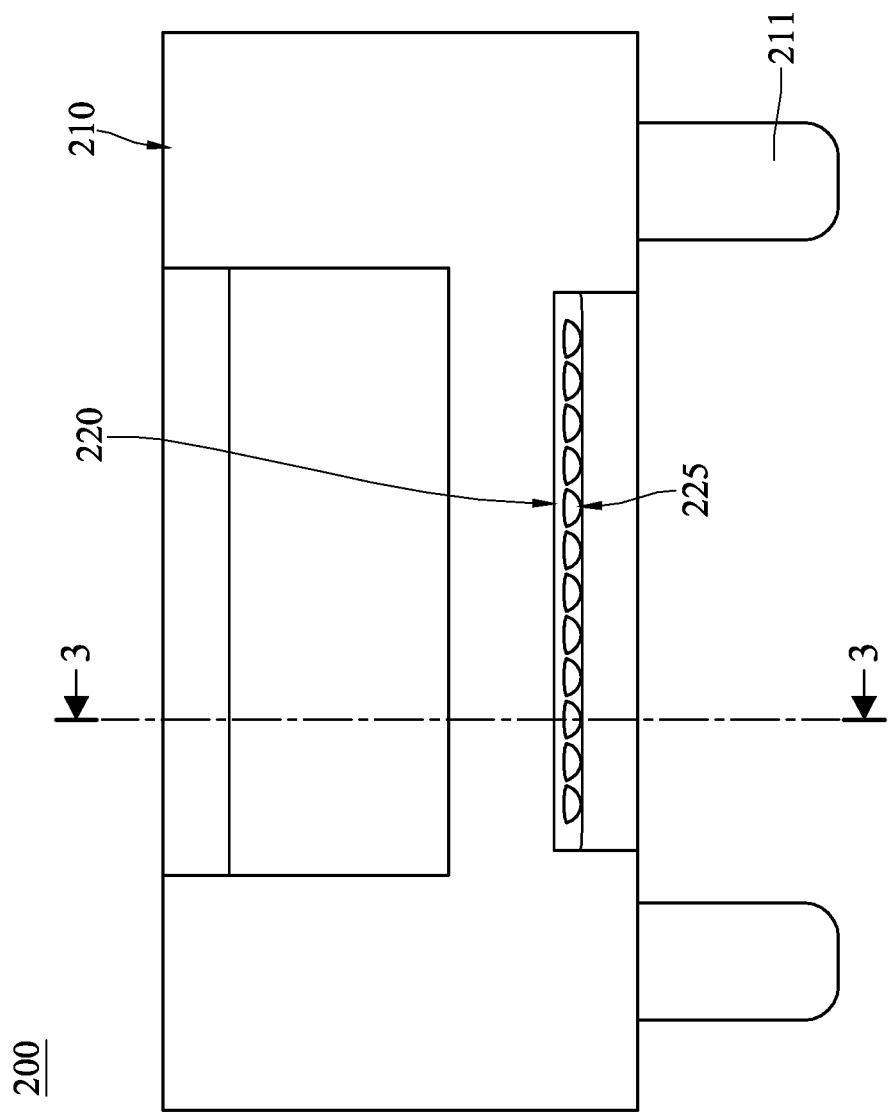
FIG. 2 is a schematic top view of an optical coupling element in FIG. 1.
Figure 3:
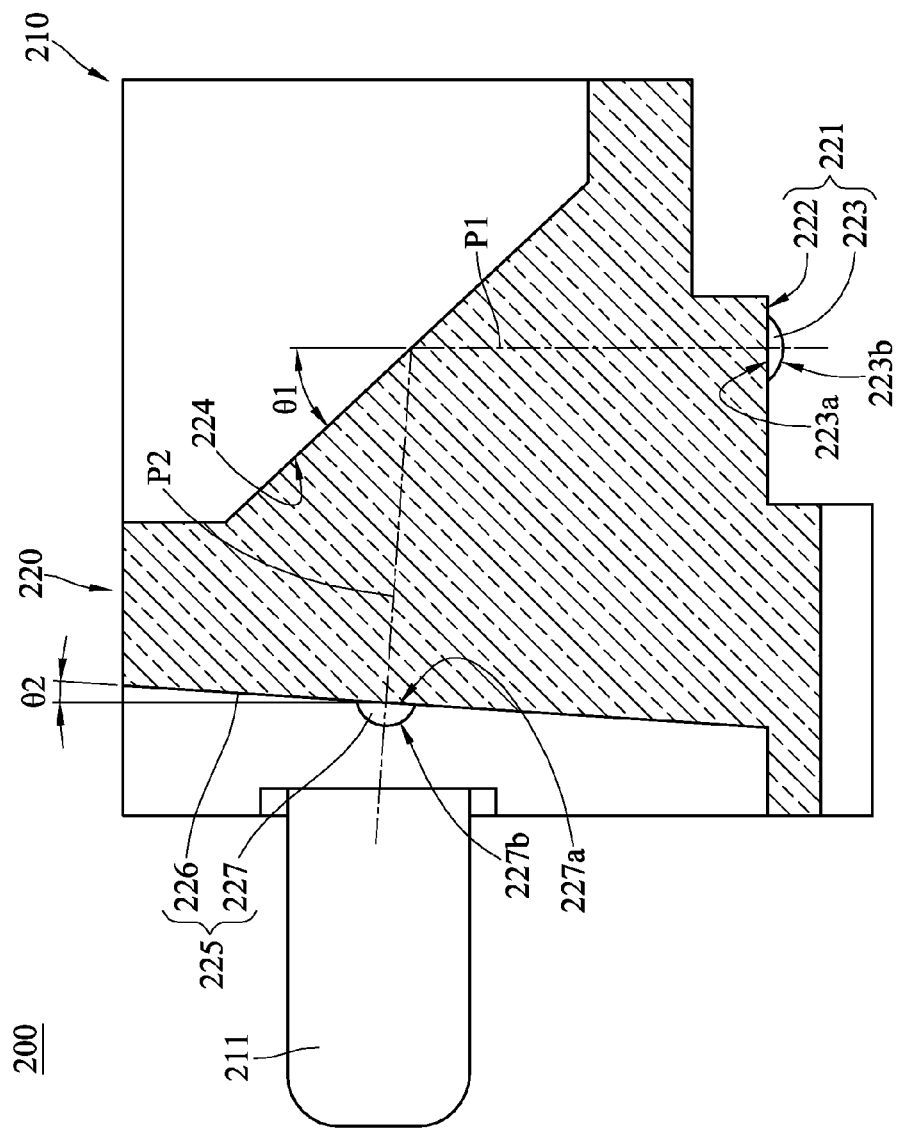
FIG. 3 is a schematic sectional view along a section line 3-3 in FIG. 2.

Please refer to FIGS. 1 to 3. FIG. 1 is a plan view of an optical module according to a first embodiment of the disclosure. FIG. 2 is a top view of an optical coupling element in FIG. 1. FIG. 3 is a sectional view along a section line 3-3 in FIG. 2. In this embodiment, the optical module 10 comprises a light emitting element 100, a light transmission element 300 and an optical coupling element 200. The light emitting element 100 may be a laser transmitter. The light emitting element 100 comprises a light emitting surface 110. The light emitting element 100 is adapted to emit a beam B after an electro-optical conversion.

The light transmission element 300 may be an optical fiber. The light transmission element 300 comprises an optical coupling surface 310 for receiving the beam B emitted from the light emitting element 100. The axis of the light transmission element 300 passes through the optical coupling surface 310.

The optical coupling element 200 is coupled to the light emitting element 100 and the light transmission element 300. The optical coupling element 200 comprises a shell 210 and a light guide element 220.

The shell 210 has two guide posts 211 which are fixed to the light transmission element 300, for fixing the relative position of the light transmission element 300 and the light guide element 220. Accordingly, the optical coupling effect of the optical module 10 may be improved. The light guide element 220, disposed on the shell 210, has a light incident part 221, a total reflection surface 224, and a light output part 225. A light incident path P1 is formed at the light incident part 221 corresponding to the light emitting element 100. A light reflection path P2 is formed at the light output part 225 corresponding to the light transmission element 300. Additionally, both of the light incident path P1 and the light reflection path P2 are the path where the beam B travels.

Furthermore, the light incident part 221 comprises a light incident surface 222 and a plurality of first lenses 223. The light incident surface 222 faces the light emitting surface 110. The first lenses 223 may be plano-convex lenses. Each first lens 223 has a first bottom surface 223a (the area of the light incident surface 222 on which each first lens 223 projects) and a first spherical surface 223b. The first bottom surfaces 223a and the light incident surface 222 are coplanar. The first spherical surfaces 223b protrude toward the light emitting element 100 and are connected to the first bottom surface 223a. In other words, the first lenses 223 are formed integrally on the light incident surface 222. The light emitting element 100 is adapted to emit a beam B toward the total reflection surface 224 of the light guide element 220 through the first spherical surfaces 223b of the first lenses 223, and the light incident path P1 is formed at the light incident part 221. In this embodiment, the light incident path P1 is perpendicular to the light incident surface 222. A first included angle θ1 is formed between the light incident path and the total reflection surface, the first included angle θ1 is not equal to 45 degrees. The light incident path P1 is, but not limited to, perpendicular to the light incident surface 222. In other embodiments, the light incident path P1 is not perpendicular to the light incident surface 222. However, the refraction of the beam B may occur when the light incident path P1 is not perpendicular to the light incident surface 222 in other embodiments.

The light output part 225 comprises a light output surface 226 and a plurality of second lenses 227. The light output surface 226 faces the optical coupling surface 310. The second lenses 227 may be plano-convex lenses. Each second lens 227 has a second bottom surface 227a (the area of the light output surface 226 on which each second lens 227 projects) and a second spherical surface 227b. The second bottom surfaces 227a of the second lenses 227 and the light output surface 226 are coplanar. The second spherical surfaces 227b protrude toward the light transmission element 300 and are connected to the second bottom surfaces 227a. In other words, the second lenses 227 are formed integrally on the light output surface 226. The light reflection path P2 is formed at the light output part 225. The beam B reflected by the total reflection surface 224 is outputted toward the light transmission element 300 from the second spherical surfaces 227b of the second lenses 227.

In this disclosure, the light incident path P1 means that a path is formed by the beam B, from the light incident surface 222 to the total reflection surface 224 at the light incident part 221. Additionally, the light reflection path P2 means that a path is formed by the beam B, from the total reflection surface 224 to the light output surface 226 at light output part 225.

In this embodiment, the light output surface 226 is perpendicular to the light reflection path P2. A second included angle θ2 is formed between the light output surface 226 and the light incident path P1. According to the reflection principle, the second included angle θ2 satisfies the following condition:

$$\theta 2 = 90° - 2\theta 1.$$

However, the light output surface 226 is not perpendicular to the light reflection path P2 in other embodiments, and it will not be repeated again.

In this embodiment, the first lenses 223 and the second lenses 227 are, but not limited to, adapted to form a lens array in a straight line, respectively. In other embodiments, the quantity of the first lens 223 may be one.

Generally speaking, when the beam B reflected by the total reflection surface 224 enters the light transmission element 300, parts of the beam B may be reflected by the optical coupling surface 310. When the first included angle θ1 is equal to 45 degrees, the parts of the beam B may be reflected back to the light emitting element 100 by the optical coupling surface 310. Thus, the parts of the beam B reflected by the optical coupling surface 310 may be interfered with the beam B emitted from the light emitting element 100, and the transmission efficiency of the optical module 10 may be reduced accordingly. As shown in FIG. 1, because the first included angle θ1 is not equal to 45 degrees, paths P3, P4 (formed by the of the parts of the beam B reflected by the optical coupling surface 310) are different from the light incident path P1 (formed by the beam B emitted from the light emitting element 100) and the light reflection path P2 (formed by beam B emitted from the light emitting element, and reflected by the total reflection surface 224). Accordingly, the parts of the beam B reflected by the optical coupling surface 310 may not interfere with the beam B emitted from the light emitting element 100, and the transmission efficiency of the optical module 10 may be improved.

Figure 4:
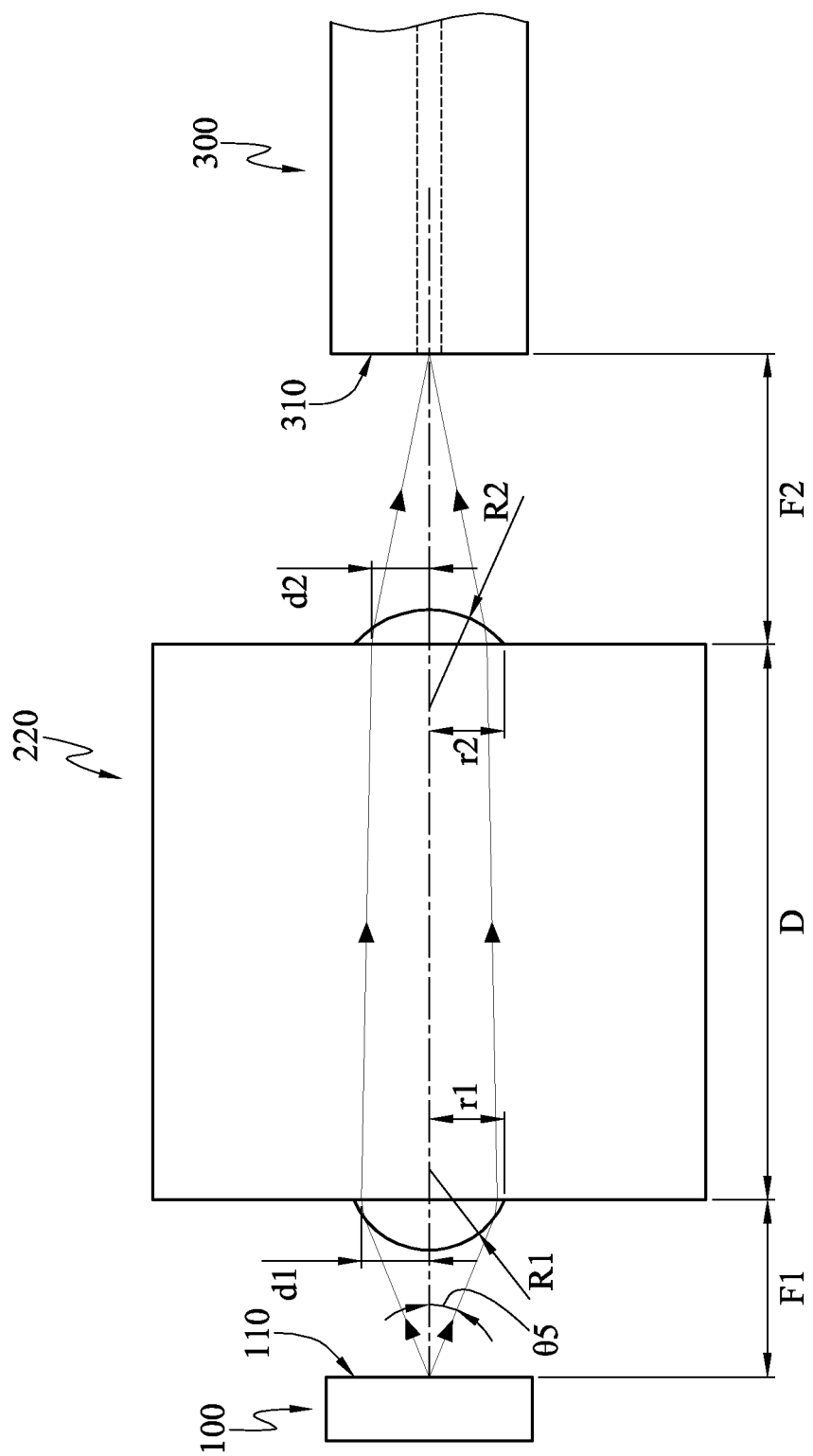
FIG. 4 is a schematic optical equivalent view of the optical module in FIG. 1.

Please refer to FIG. 3 and FIG. 4. FIG. 4 is an optical equivalent view of the optical module in FIG. 1. To prevent the beam B emitted from the light emitting element 100 from diverging, and to improve the optical coupling effect, the beam B emitted from the light emitting element 100 may be focused on the light transmission element 300. Accordingly, the parameters and dimensions of optical module 10 must be controlled and defined as follows:

1. The radius r1 of each first bottom surface 223a (the area of the light incident surface 222 on which each first lens 223 projects) is equal to the radius r2 of each second bottom surface 227a (the area of the light output surface 226 on which each second lens 227 projects);

2. The radius d1 of a light spot formed by the beam B passing through the first lenses 223 is greater than or equal to 0.6 times the radius r1 of the each first bottom surface 223a, and the radius d1 of a light spot is less than or equal to 0.8 times the radius r1 of each first bottom surface 223a;

3. A first interval F1 is formed between the light emitting surface 100 and the light incident surface 222, and the first interval F1 is greater than the focal length f1 of each first lens 223;

4. A second interval F2 is formed between the axis of the light transmission element 300 and the light output surface 226, and the second interval F2 is greater than the first interval F1; and 5. The curvature radius R1 of each first spherical surface 223b is greater than the curvature radius R2 of each second spherical surface 227b, the curvature radius R1 and the radius d1 of the light spot satisfy the following condition:

$$R1=d1*[1+(n5-\cos\theta5)^2/(\sin\theta5)^2]^{1/2}; \text{ wherein,}$$

n5 is the refraction index of each first lens;

θ5 is the half of the divergent angle of the beams emitted from light emitting element 100; and sinθ5 is the sine value of the half of the divergent angle of the beams emitted from light emitting element 100;

similarly, the curvature radius R2 and the radius d2 of the light spot satisfy the following condition:

$$R2=d2*[1+(n6-\cos\theta5)^2/(\sin\theta5)^2]^{1/2}; \text{ wherein,}$$

n6 is the refraction index of each second lens;

n5=n6, however, n5 is, but not limited to, equal to n6.

Accordingly, the radius d1 of the light spot formed by the beam B passing through the first lenses 223 is greater than or equal to the radius d2 of the light spot formed by the beam B passing through the second lenses 227, so that the beam B emitted from the light emitting element 100 may be focused on the light transmission element 300 accurately.

Additionally, a third included angle θ3 is formed between the axis of the light transmission element 300 and the normal line of the light output surface 226 (such as the light reflection path P2). A fourth included angle θ4 is formed between the optical coupling surface 310 and the light incident path P1. The refraction index of the light transmission element 300 is n1, and the third included angle θ3 and the fourth included angle θ4 satisfy the following condition:

$$\theta3=\arcsin(n1*\sin\theta4)-\theta4; \text{ wherein,}$$

θ3=θ2.

For example, the fourth included angle θ4 is 8 degrees, n1 is 1.467. Accordingly, the third included angle θ3 and the second included angle θ2 are both equal to 3.78 degrees. The fourth included angle θ4 plus the second included angle θ2 equals about 11.78 degrees. The first included angle θ1 is about 43.11 degrees (according to θ2=90°−2θ1). According to the above-mentioned parameters (such as angles and intervals), the parts of the beam B reflected by the optical coupling surface 310 may not be interfered with the beam B emitted from the light emitting element 100, and the transmission efficiency of the optical module 10 may be improved.

According to the optical coupling element and the optical module having the same as the disclosure, the first included angle θ1 is not equal to 45 degrees, so that the paths P3, P4 (formed by the of the parts of the beam B reflected by the optical coupling surface 310) are different from the light incident path P1 (formed by the beam B emitted from the light emitting element) and the light reflection path P2 (formed by beam B emitted from the light emitting element, and reflected by the total reflection surface 224). Accordingly, the parts of the beam B reflected by the optical coupling surface 310 may not interfere with the beam B emitted from the light emitting element 100, and the transmission efficiency of the optical module 10 may be improved.

Additionally, the first included angle θ1 and the second included angle θ2 satisfy the following condition:

$$\theta2=90°-2\theta1.$$

Accordingly, the optical coupling effect of the optical module 10 may be improved.

Furthermore, the fourth included angle θ4 plus the second included angle θ2 equals 11.78 degrees. Thus, the optical coupling effect of the optical module 10 may be improved.

The disclosure will become more fully understood from the said embodiment for illustration only and thus does not limit the disclosure. Any modifications within the spirit and category of the disclosure fall in the scope of the disclosure.

What is claimed is:

1. An optical coupling element, for coupling a light emitting element to a light transmission element, comprising:
   a light guide element, wherein the light guide element includes:
      a light incident part;
      a total reflection surface; and
      a light output part having a light output surface, a light incident path is formed at the light incident part corresponding to the light emitting element, a light reflection path is formed at the light output part corresponding to the light transmission element, a first included angle $\theta_1$ is formed between the light incident path and the total reflection surface, the first included angle $\theta_1$ is not equal to 45 degrees, and a second included angle $\theta_2$ is formed between the light output surface and the light incident path, wherein the light output surface and the light incident path are not parallel;
   wherein the light emitting element is adapted to emit a beam toward the total reflection surface along the light incident path by passing through the light guide element from the light incident part, then the beam is reflected by the total reflection surface, and the beam is outputted toward the light transmission element from the light output part.

2. The optical coupling element according to claim 1, wherein the light incident part comprises a light incident surface and at least one first lens, the first lens disposed on the light incident surface is adapted to receive the beam emitted by the light emitting element, the light output part further comprises at least one second lens, and the second lens disposed on the light output surface is adapted to output the beam reflected by the total reflection surface.

3. The optical coupling element according to claim 2, wherein the second included angle $\theta_2$ satisfies a condition: $\theta=90°-2\theta_1$.

4. The optical coupling element according to claim 2, wherein the first lens has a first bottom surface and a first spherical surface, the first bottom surface is contacted with the light incident part, the first spherical surface protrudes toward the light emitting element and is connected to the first bottom surface, the second lens has a second bottom surface and a second spherical surface, the second bottom surface is contacted with the light output part, and the second spherical surface protrudes toward the light transmission element and is connected to the second bottom surface.

5. The optical coupling element according to claim 4, wherein a radius of the first bottom surface is equal to a radius of the second bottom surface.

6. The optical coupling element according to claim 2, wherein a radius of a light spot formed by the beam passing through the first lens is greater than or equal to a radius of a light spot formed by the beam passing through the second lens.

7. The optical coupling element according to claim 2, wherein the light incident path is perpendicular to the light incident surface.

8. The optical coupling element according to claim 1, further comprising a shell, the light guide element is disposed in the shell, and the shell has two guide posts for fixing a relative position of the light transmission element and the light guide element.

9. An optical module, comprising:
a light emitting element for emitting a beam;
a light transmission element; and
an optical coupling element for coupling the light emitting element to the light transmission element, wherein the optical coupling element comprises a light guide element, the light guide element has a light incident part, a total reflection surface and a light output part, the light output part having a light output surface, a light incident path is formed at the light incident part corresponding to the light emitting element, a light reflection path is formed at the light output part corresponding to the light transmission element, a first included angle $\theta_1$ is formed between the light incident path and the total reflection surface, the first included angle $\theta_1$ is not equal to 45 degrees and a second included angle $\theta_2$ is formed between the light output surface and the light incident path, wherein the light output surface and the light incident path are not parallel;
wherein the light emitting element is adapted to emit a beam toward the total reflection surface along the light incident path by passing through the light guide element from the light incident part, then the beam is reflected by the total reflection surface, and the beam is outputted toward the light transmission element from the light output part.

10. The optical module according to claim 9, wherein the light emitting element comprises a light emitting surface, the light transmission element comprises an optical coupling surface, an axis of the light transmission element passes through the optical coupling surface, the light incident part comprises a light incident surface and at least one first lens, the light incident surface faces the light emitting surface, the first lens disposed on the light incident surface is adapted to receive the beam emitted by the light emitting element, the light output part faces the optical coupling surface and further comprises at least one second lens, and the second lens disposed on the light output surface is adapted to output the beam reflected by the total reflection surface.

11. The optical module according to claim 10, wherein the second included angle $\theta_2$ satisfies a condition: $\theta_2=90°-2\theta_1$.

12. The optical module according to claim 11, wherein a third included angle $\theta_3$ is formed between the axis of the light transmission element and a normal line of the light output surface, and the third included angle $\theta_3$ is equal to the second included angle $\theta_2$.

13. The optical module according to claim 12, wherein a fourth included angle $\theta_4$ is formed between the optical coupling surface and the light incident path, a refraction index of the light transmission element is $n_1$, and the third included angle $\theta_3$ satisfies a condition:

$$\theta_3=\arcsin(n_1*\sin\theta_4)-\theta_4.$$

14. The optical module according to claim 13, wherein the fourth included angle $\theta_4$ is 8 degrees.

15. The optical module according to claim 10, wherein a first interval is formed between the light emitting surface and the light incident surface, and the first interval is greater than a focal length of the first lens.

16. The optical module according to claim 15, wherein a second interval is formed between the axis of the light transmission element and the light output surface, and the second interval is greater than the first interval.

17. The optical module according to claim 10, wherein the first lens has a first bottom surface and a first spherical surface, the first bottom surface is contacted with the light incident part, the first spherical surface protrudes toward the light emitting element and is connected to the first bottom surface, the second lens has a second bottom surface and a second spherical surface, the second bottom surface is contacted with the light output part, and the second spherical surface protrudes toward the light transmission element and is connected to the second bottom surface.

18. The optical module according to claim 17, wherein a radius of a light spot formed by the beam passing through the first lens is greater than or equal to 0.6 times a radius of the first bottom surface, and the radius of the light spot is less than or equal to 0.8 times the radius of the first bottom surface.

* * * * *